US011671867B2

(12) United States Patent
Zhang et al.

(10) Patent No.: US 11,671,867 B2
(45) Date of Patent: Jun. 6, 2023

(54) LISTEN BEFORE TALK TYPE DEPENDENT CHANNEL MEASUREMENTS FOR SIDELINK COMMUNICATIONS

(71) Applicant: QUALCOMM Incorporated, San Diego, CA (US)

(72) Inventors: Xiaoxia Zhang, San Diego, CA (US); Jing Sun, San Diego, CA (US); Yisheng Xue, San Diego, CA (US); Tao Luo, San Diego, CA (US); Arthur Gubeskys, San Diego, CA (US); Shuanshuan Wu, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 17/360,689

(22) Filed: Jun. 28, 2021

(65) Prior Publication Data

US 2022/0046467 A1 Feb. 10, 2022

Related U.S. Application Data

(60) Provisional application No. 63/061,033, filed on Aug. 4, 2020.

(51) Int. Cl.
*H04W 28/02* (2009.01)
*H04W 74/08* (2009.01)
(Continued)

(52) U.S. Cl.
CPC ....... *H04W 28/0289* (2013.01); *H04W 24/08* (2013.01); *H04W 28/0284* (2013.01); *H04W 72/56* (2023.01); *H04W 74/0808* (2013.01)

(58) Field of Classification Search
CPC ......... H04W 28/0289; H04W 28/0284; H04W 24/08; H04W 72/10; H04W 74/0808; H04W 76/14; H04W 92/18; H04W 72/56
See application file for complete search history.

(56) References Cited

U.S. PATENT DOCUMENTS

2021/0022139 A1* 1/2021 Shin ................. H04W 72/0406
2021/0219268 A1* 7/2021 Li .............................. H04L 1/08
(Continued)

*Primary Examiner* — Robert C Scheibel
(74) *Attorney, Agent, or Firm* — Qualcomm Incorporated

(57) ABSTRACT

Methods, systems, and devices for wireless communications are described. A user equipment may determine parameters for congestion metrics based on a type for a channel access procedure associated with a sidelink transmission. The user equipment may determine a channel access procedure type for a sidelink channel transmission, and determine a limit for a channel occupancy (e.g., a channel occupancy ratio) based on the type. The user equipment may compare the channel occupancy with the limit to determine whether to transmit the sidelink channel transmission, based on whether the channel is available. In some aspects, the user equipment may additionally perform the channel access procedure (e.g., a listen before talk procedure) to determine whether to transmit the sidelink channel transmission. The user equipment may also perform channel measurements to obtain a congestion metric (e.g., a channel busy ratio) based on a threshold before transmitting the sidelink channel transmission.

26 Claims, 11 Drawing Sheets

(51) Int. Cl.
*H04W 24/08* (2009.01)
*H04W 72/56* (2023.01)

(56) References Cited

U.S. PATENT DOCUMENTS

| | | | | |
|---|---|---|---|---|
| 2021/0314796 | A1* | 10/2021 | Hoang | H04W 52/36 |
| 2022/0167413 | A1* | 5/2022 | Myung | H04W 74/004 |
| 2022/0174741 | A1* | 6/2022 | Myung | H04W 72/0453 |
| 2022/0183018 | A1* | 6/2022 | Wang | H04L 1/189 |
| 2022/0279577 | A1* | 9/2022 | Zhang | H04W 72/1289 |
| 2022/0322342 | A1* | 10/2022 | Hong | H04W 72/0446 |

* cited by examiner

LISTEN BEFORE TALK TYPE DEPENDENT CHANNEL MEASUREMENTS FOR SIDELINK COMMUNICATIONS

CROSS REFERENCE

The present application for patent claims the benefit of U.S. Provisional Patent Application No. 63/061,033 by ZHANG et al., entitled "LISTEN BEFORE TALK TYPE DEPENDENT CHANNEL MEASUREMENTS FOR SIDELINK COMMUNICATIONS," filed Aug. 4, 2020, assigned to the assignee hereof, and expressly incorporated by reference herein.

FIELD OF TECHNOLOGY

The following relates to wireless communications, including listen-before-talk (LBT) type dependent channel measurements for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Such multiple-access systems may include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The present disclosure relates to methods, systems, devices, and apparatuses that support listen before talk type dependent channel measurements for sidelink communications. Generally, the described techniques provide for enabling a user equipment (UE) to determine parameters for congestion metrics based on a type for a channel access procedure associated with a sidelink transmission. The UE may determine a channel access procedure type for a sidelink channel transmission, and determine a limit for a channel occupancy based on the type. The UE may compare the channel occupancy with the limit to determine whether to transmit the sidelink channel transmission (e.g., to determine whether the transmission complies with channel occupancy limits). In some aspects, the UE may additionally perform the channel access procedure (e.g., a listen-before-talk (LBT) procedure) to determine whether to transmit the sidelink channel transmission. The UE may also perform channel measurements to obtain a congestion metric (e.g., a channel busy ratio (CBR)) based on a threshold before transmitting the sidelink channel transmission. In some aspects, a base station may transmit a configuration identifying the type, the limit, the threshold, or any combination thereof.

A method for wireless communications implemented by a user equipment (UE) is described. The method may include performing one or more channel measurements of a shared frequency channel, performing a channel access procedure for a sidelink transmission over the shared frequency channel based on a type of the channel access procedure, comparing a metric of a channel occupancy for the shared frequency channel with a limit associated with the channel occupancy based on the type of the channel access procedure, and transmitting the sidelink channel transmission based on a result of comparing the metric of the channel occupancy with the limit.

An apparatus for wireless communications implemented by a UE is described. The apparatus may include a processor, memory coupled with the processor, and instructions stored in the memory. The instructions may be executable by the processor to cause the apparatus to perform one or more channel measurements of a shared frequency channel, perform a channel access procedure for a sidelink transmission over the shared frequency channel based on a type of the channel access procedure, compare a metric of a channel occupancy for the shared frequency channel with a limit associated with the channel occupancy based on the type of the channel access procedure, and transmit the sidelink channel transmission based on a result of comparing the metric of the channel occupancy with the limit.

Another apparatus for wireless communications implemented by a UE is described. The apparatus may include means for performing one or more channel measurements of a shared frequency channel, means for performing a channel access procedure for a sidelink transmission over the shared frequency channel based on a type of the channel access procedure, means for comparing a metric of a channel occupancy for the shared frequency channel with a limit associated with the channel occupancy based on the type of the channel access procedure, and means for transmitting the sidelink channel transmission based on a result of comparing the metric of the channel occupancy with the limit.

A non-transitory computer-readable medium storing code for wireless communications implemented by a UE is described. The code may include instructions executable by a processor to perform one or more channel measurements of a shared frequency channel, perform a channel access procedure for a sidelink transmission over the shared frequency channel based on a type of the channel access procedure, compare a metric of a channel occupancy for the shared frequency channel with a limit associated with the channel occupancy based on the type of the channel access procedure, and transmit the sidelink channel transmission based on a result of comparing the metric of the channel occupancy with the limit.

In some aspects of the method, apparatuses, and non-transitory computer-readable medium described herein, performing the one or more channel measurements may include operations, features, means, or instructions for performing the one or more channel measurements of the shared frequency channel to obtain a congestion metric based on a threshold associated with the type of the channel access procedure, where the transmitting the sidelink channel transmission may be based on the congestion metric.

Some aspects of the method, apparatuses, and non-transitory computer-readable medium described herein may further include operations, features, means, or instructions for selecting the congestion metric from a set of multiple congestion metrics based on the type of the channel access procedure, the set of multiple congestion metrics corresponding to a set of multiple thresholds associated with a set of multiple types for the channel access procedure.

In some aspects of the method, apparatuses, and non-transitory computer-readable medium described herein, the limit associated with the channel occupancy for the UE for the shared frequency channel may be further based on the congestion metric.

In some aspects of the method, apparatuses, and non-transitory computer-readable medium described herein, comparing, for each of the one or more channel measurements, the one or more channel measurements to the determined threshold to obtain a channel busy ratio for the shared frequency channel, where the congestion metric includes the channel busy ratio.

In some aspects of the method, apparatuses, and non-transitory computer-readable medium described herein, the threshold includes a received signal strength indicator threshold.

Some aspects of the method, apparatuses, and non-transitory computer-readable medium described herein may further include operations, features, means, or instructions for selecting the limit from a set of multiple limits based on the type of the channel access procedure, the set of multiple limits associated with a set of multiple types of the channel access procedure.

Some aspects of the method, apparatuses, and non-transitory computer-readable medium described herein may further include operations, features, means, or instructions for receiving a configuration indicating the type of the channel access procedure and the limit associated with the channel occupancy, where the type of the channel access procedure and the limit may be based on the receiving the configuration.

In some aspects of the method, apparatuses, and non-transitory computer-readable medium described herein, an indication of the configuration may be received in a sidelink control information message, a radio resource control message, or a combination thereof.

In some aspects of the method, apparatuses, and non-transitory computer-readable medium described herein, the transmitting the sidelink channel transmission over the shared frequency channel may be based on the channel occupancy not exceeding the limit.

In some aspects of the method, apparatuses, and non-transitory computer-readable medium described herein, the comparing the channel occupancy with the limit may be further based on a congestion control processing time associated with a UE processing capability.

In some aspects of the method, apparatuses, and non-transitory computer-readable medium described herein, the limit may be based on a priority value associated with the sidelink channel transmission.

DETAILED DESCRIPTION

Figure 1:
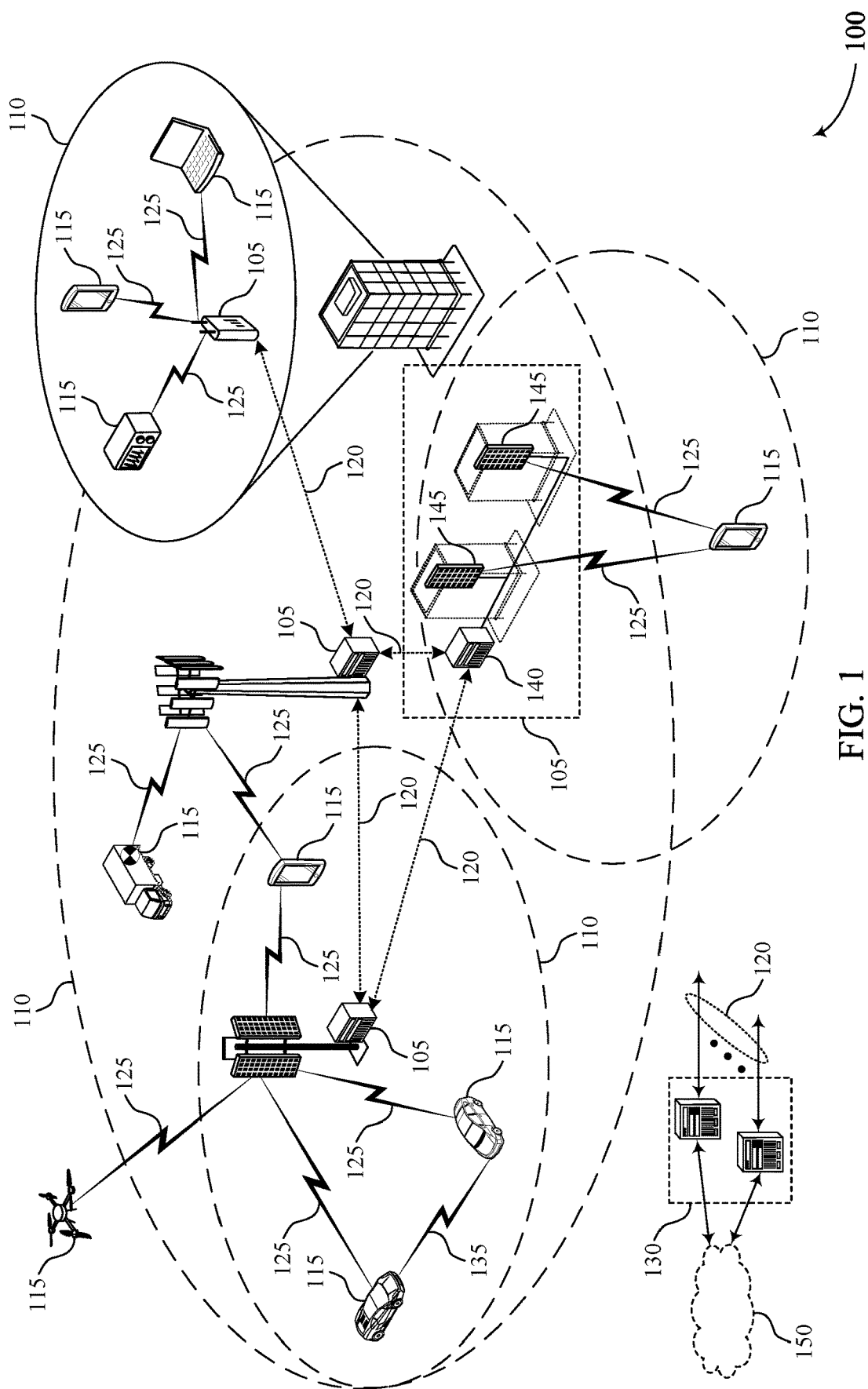
FIGS. 1 and 2 illustrate examples of wireless communications systems that support listen before talk type dependent channel measurements for sidelink communications in accordance with aspects of the present disclosure.

Some wireless communication systems may include one or more user equipments (UEs) and one or more base stations, such as next-generation NodeBs or giga-NodeBs (either of which may be referred to as a gNB) that may support one or more multiple radio access technologies including 4G systems such as Long Term Evolution (LTE) systems, fifth generation (5G) systems which may be referred to as New Radio (NR) systems, and Wi-Fi systems (e.g., wireless local area network (WLAN) systems). According to one or more of these example radio access technologies (RATs), one or more UEs may communicate directly with one another in sidelink communication channels without transmitting through a base station or through a relay point. A sidelink communication may be an aspect of device-to-device (D2D) communication, vehicle-to-everything (V2X) communication, or another aspect of sidelink communication in a wireless communications system.

In some cases, UEs may communicate via sidelink transmissions in unlicensed spectrum to avoid incurring the usage of licensed spectrum. Prior to transmitting a sidelink transmission (e.g., a physical sidelink shared channel (PSSCH) transmission), a UE may measure channel occupancy (e.g., congestion) in terms of congestion metrics, such as a channel occupancy ratio (CR), a channel busy ratio (CBR), etc. In unlicensed spectrum, the UE may additionally perform a channel access procedure (e.g., a listen-before-talk (LBT) procedure) to determine whether the channel is available for transmitting the sidelink transmission. The UE may be configured to perform different types of channel access procedures, in one aspect based on whether the UE initiates a distinct channel occupancy time (COT) or shares a COT with another device, or based on a transmission gap within a shared COT. The type of channel access procedure may determine the period of time the UE performs the channel access procedure, and so different channel access types may correspond to different medium access probabilities for the UE. It may be beneficial to measure congestion metrics based on the configured channel access type to reflect the medium access probability.

According to the techniques described herein, a UE may be configured to determine parameters for congestion metrics based on a type for a channel access procedure associated with a sidelink transmission. The UE may determine a channel access procedure type for a sidelink channel transmission, and determine a limit for a channel occupancy (e.g., a CR) based on the type. The UE may compare its channel occupancy (e.g., over a time window) with the limit to determine whether to transmit the sidelink channel transmission (e.g., a PSSCH transmission). In some aspects, the UE may additionally perform the channel access procedure (e.g., an LBT procedure) to determine whether to transmit the sidelink channel transmission. The UE may also perform channel measurements to obtain a congestion metric (e.g., a CBR) based on a threshold before transmitting the sidelink channel transmission. In some aspects, a base station may transmit a configuration identifying the type, the limit, the threshold, or any combination thereof.

Aspects of the disclosure are initially described in the context of wireless communications systems. Aspects of the disclosure are further illustrated by and described with reference to a timing diagram, a process flow, apparatus diagrams, system diagrams, and flowcharts that relate to listen before talk type dependent channel measurements for sidelink communications.

FIG. 1 illustrates an example of a wireless communications system 100 that supports listen before talk type dependent channel measurements for sidelink communications in accordance with aspects of the present disclosure. The wireless communications system 100 may include one or more base stations 105, one or more UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some aspects, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. In one aspect, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. In one aspect, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, in one aspect, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, in one aspect, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. In one aspect, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In other aspects, the overlapping geographic coverage areas 110 associated with different technologies may be supported by different base stations 105. The wireless communications system 100 may include, in one aspect, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some aspects, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. In one aspect, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. In one aspect, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some aspects, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some aspects, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the base stations 105, and EHF antennas of the respective devices may be smaller and more closely spaced than UHF antennas. In some aspects, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. In one aspect, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. In one aspect, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a UE 115 may be configured to determine parameters for congestion metrics based on a type for a channel access procedure associated with a sidelink transmission. The UE 115 may determine a channel access procedure type for a sidelink channel transmission, and determine a limit for a channel occupancy (e.g., a CR) based on the type. The UE 115 may compare its channel occupancy (e.g., over a time window) with the limit to determine whether to transmit the sidelink channel transmission (e.g., a PSSCH transmission). In some aspects, the UE 115 may additionally perform the channel access procedure (e.g., an LBT procedure) to determine whether to transmit the sidelink channel transmission. The UE 115 may also perform channel measurements to obtain a congestion metric (e.g., a CBR) based on a threshold before transmitting the sidelink channel transmission, which may also be used to determine the limit for channel occupancy. In addition, the threshold for the congestion metric (e.g., CBR) may be based on the LBT type. In some aspects, a base station 105 may transmit a configuration identifying the type, the limit, the threshold, or any combination thereof.

Figure 2:
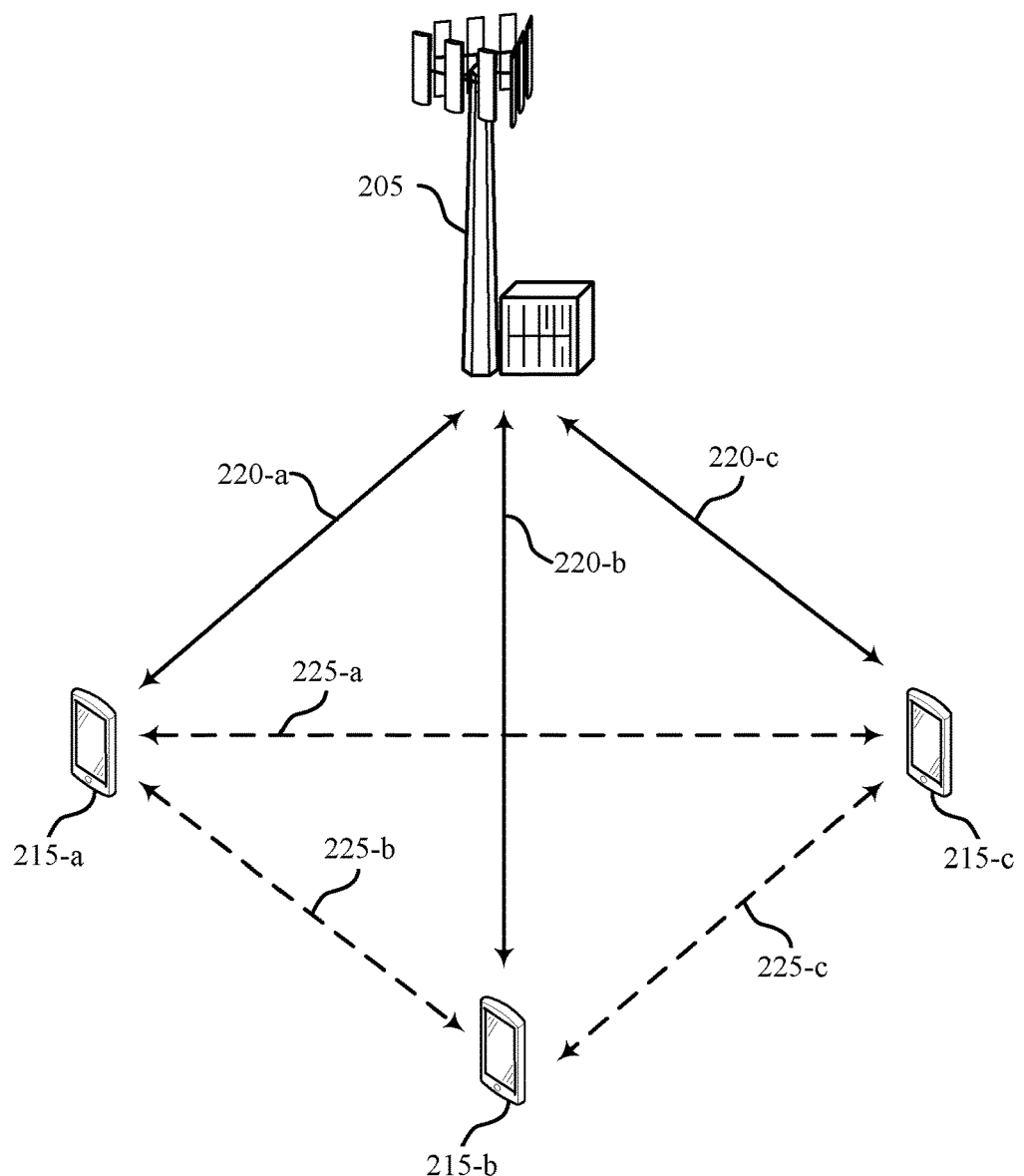

FIG. 2 illustrates an example of a wireless communications system 200 that supports LBT type dependent channel measurements for sidelink communications in accordance with aspects of the present disclosure. In some aspects, the wireless communications system 200 may implement aspects of the wireless communications system 100. The wireless communications system 200 may include a base station 205 and UEs 215, which may be examples of the corresponding devices described with reference to FIG. 1. The wireless communications system 200 may include features for improved sidelink communication operations, among other benefits.

The UEs 215 may transmit and receive communications as scheduled by the base station 205. The UEs 215 may communicate with the base station via direct links 220 (e.g., communication links 125 described with reference to FIG. 1). Additionally or alternatively, the UEs 215 may communicate directly with one another via sidelink connections 225 without transmitting through the base station 205. The sidelink connections 225 may illustrate aspects of D2D communication, V2X communication, or another aspect of sidelink communication in the wireless communications system 200.

In some cases, a UE 215 may be configured to measure congestion on sidelink channels (which may be referred to as subchannels) before communicating via a sidelink connection 225. In one aspect, the sidelink connection 225 may represent a set of sidelink channels in a resource pool. In some aspects, the UE 215 may measure a sidelink received signal strength indicator (RSSI) for a sidelink channel of the sidelink connection 225. The sidelink RSSI may be defined as a linear average of a received power (e.g., as measured in watts (W) or decibel milliwatts (DBm)) observed on the sidelink channel in symbols of a slot configured for sidelink transmissions (e.g., PSSCH or physical sidelink control channel (PSCCH) transmissions). A CBR for the sidelink connection 225 may be evaluated at a slot by identifying a quantity of sidelink channels in the resource pool with a sidelink RSSI that exceeds a threshold, where the UE 215 measures the sidelink RSSI for each sidelink channel of the set over a measurement window. In some aspects, the measurement window may be configured by a parameter (e.g., a higher layer parameter, which may be referred to as timeWindowSize-CBR). The measurement window may include a duration (e.g., 100 ms) corresponding to a set of slots (e.g., $100 \cdot 2^\mu$ slots, where $\mu$ is a numerology parameter based on a subcarrier spacing of the sidelink channels of the sidelink connection 225) preceding the slot at which the CBR is evaluated. In some aspects, the measurement window may be preconfigured at the UE 215. Additionally or alternatively, the UE 215 may receive an indication of the measurement window from the base station 205.

In some aspects, the UE 215 may use the determined CBR as a metric for congestion control on the sidelink connection 225. In some aspects, the congestion control may restrict transmission parameters associated with communication on the sidelink connection 225. The transmission parameters may include one or more modulation and coding scheme (MCS) indices and tables, a quantity of sidelink channels used for transmissions, a quantity of retransmissions on the sidelink channels, a transmission power, a CR limit, an additional transmission parameter, or any combination thereof.

In some aspects, the UE 215 may determine a sidelink CR as a metric for congestion control on the sidelink connection 225. The UE 215 may evaluate the sidelink CR at a slot by identifying a first quantity of sidelink channels used for transmissions in a first quantity of slots (e.g., a) preceding the slot and a second quantity of sidelink channels granted for transmissions in a second quantity of slots (e.g., b) following the slot, where CR is the sum of the first and second quantities of sidelink channels divided by the total quantity of configured sidelink channels in the resource pool over the first and second quantities of slots. In some aspects, the sum of the first and second quantities of slots may be a configured quantity (e.g., $a+b+1=1000$ or $1000 \cdot 2^\mu$ slots).

The UE 215 may compare the determined sidelink CR to a CR limit, which in some aspects may be configured by a higher layer parameter (e.g., a parameter referred to as sl-CR-Limit). The comparison may be expressed as:

$$\Sigma_{i=k} CR(i) \leq CR_{Limit}(k), \quad (1)$$

where a sidelink communication associated with the UE 215 may have a priority value i, and the parameter configuring the CR limit may configure a priority value k. In some aspects, the CR limit may be based on the determined sidelink CBR (e.g., CR limits may be associated with a range of CBR values).

In some aspects, the UE 215 may be configured to determine congestion metrics (e.g., the sidelink CR, the sidelink CBR, or both) within a congestion control processing time, which may include a quantity of slots (e.g., N slots). The congestion control processing time may be based on a processing capability of the UE 215.

In some cases, the sidelink connections 225 between the UEs 215 may include sidelink channels in unlicensed spectrum to avoid incurring the usage of licensed spectrum. In addition to determining congestions metrics, a UE 215 may perform a channel access procedure (e.g., an LBT procedure) prior to communicating on a sidelink channel in unlicensed spectrum to determine whether the sidelink channel is available for transmitting a sidelink transmission. The UE 215 may be configured to perform different types of channel access procedures, in one aspect based on whether the UE 215 initiates a distinct COT on the sidelink connection 225 or shares a COT with another UE 215, or based on a transmission gap within a shared COT. The type of channel access procedure may determine the period of time the UE 215 performs the channel access procedure, and so different channel access types may correspond to different medium access probabilities for the UE 215. It may be beneficial to determine congestion metrics based on the configured channel access type to reflect the medium access probability.

According to the techniques described herein, a UE 215 may be configured to determine parameters for congestion metrics based on a type for a channel access procedure associated with a sidelink transmission (e.g., a PSSCH transmission) on a sidelink connection 225. The UE 215 may determine a channel access procedure type for the sidelink transmission, and determine a CR limit based on the type. The UE 215 may compare the determined sidelink CR with the CR limit to determine whether to transmit the sidelink transmission. In some aspects, the UE 215 may additionally perform the channel access procedure (e.g., an LBT procedure) to determine whether to transmit the sidelink transmission. The UE may also determine a CBR based on an RSSI threshold before transmitting the sidelink transmission. In some aspects, the RSSI threshold may also be dependent on the type for the channel access procedure (e.g., the UE 215 may maintain separate RSSI measurements for different types of channel access procedures). In some aspects, the base station 205 may transmit a configuration (e.g., in a sidelink control information (SCI) message or an RRC message), where the configuration may identify the type, the CR limit, the RSSI threshold (e.g., per type of channel access procedure), or any combination thereof. In some aspects, the base station 205 may not be involved in the sidelink communication 225, such as in V2X communications without deployment of the base station 205 in an intelligent transport system (ITS) spectrum or in cases where the sidelink UEs 215 may be outside the coverage area of the base station 205. In aspects where the base station 205 is not involved, the RSSI threshold as a function of the channel access procedure type may be preconfigured at the UE 215.

Figure 3:
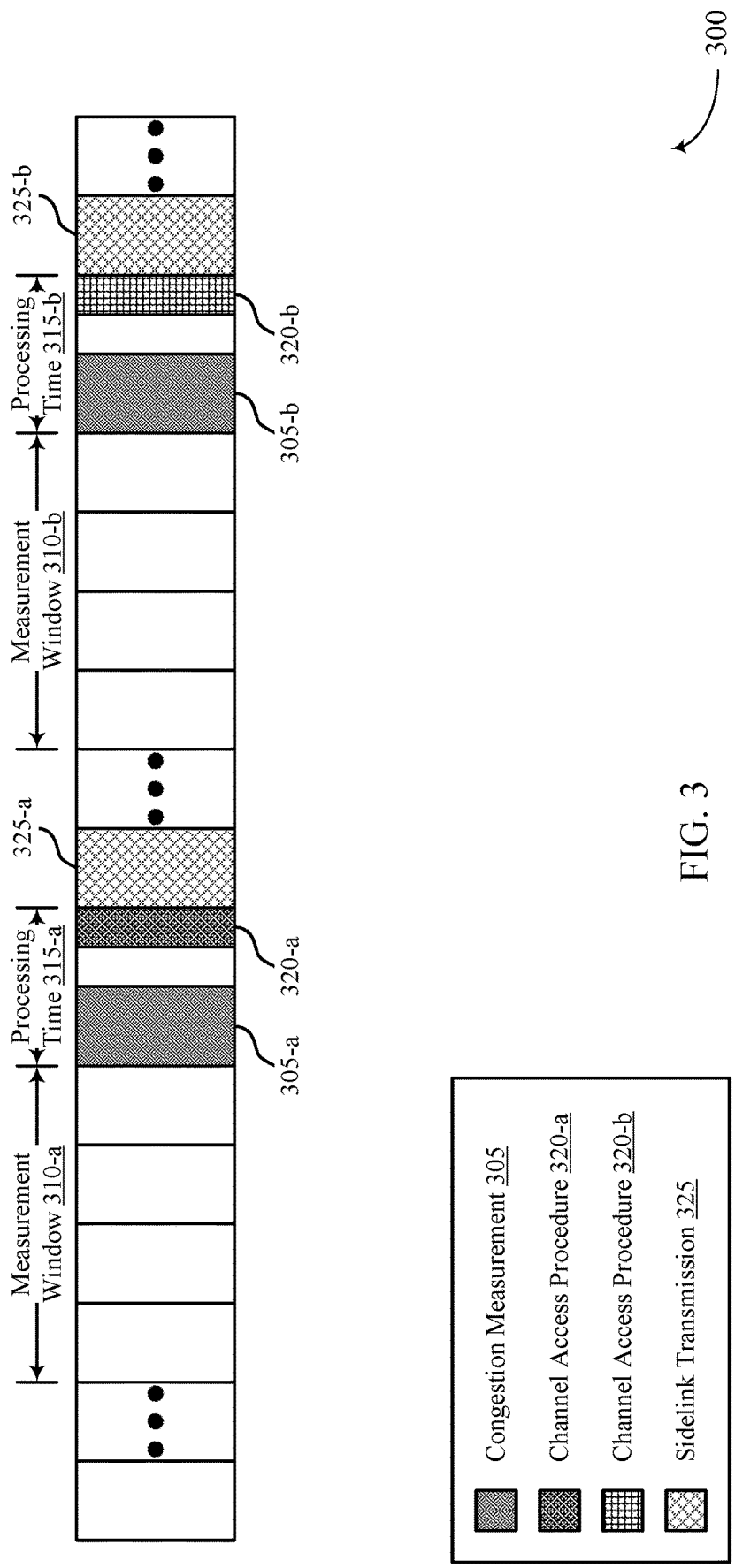
FIG. 3 illustrates an example of a timing diagram that supports listen before talk type dependent channel measurements for sidelink communications in accordance with aspects of the present disclosure.

FIG. 3 illustrates an example of a timing diagram 300 that supports LBT type dependent channel measurements for sidelink communications in accordance with aspects of the present disclosure. In some aspects, the timing diagram 300 may implement aspects of wireless communications systems 100 and 200. The timing diagram 300 may illustrate operations performed at a UE 115 described with reference to FIG. 1.

A UE may be scheduled to transmit a sidelink transmission 325 in a slot. Prior to transmitting the sidelink transmission 325, the UE may perform a congestion measurement 305 to determine congestion metrics (e.g., a sidelink CR, a sidelink CBR, or both) at a slot within a congestion control processing time 315 (e.g., a quantity of slots, such as N slots) prior to the slot scheduled for the sidelink transmission 325. The congestion measurement 305 may be based on one or more channel measurements performed at the UE in a measurement window 310, which may include a duration corresponding to a set of slots. In some aspects, a length of the congestion control processing time 315 (e.g., the quantity of slots) may be based on a processing capability of the UE. In some aspects, a base station may configure the duration of the measurement window 310 via a higher layer parameter.

In some cases, the UE may be scheduled to transmit the sidelink transmission 325 in unlicensed spectrum to avoid incurring the usage of licensed spectrum. In addition to determining congestions metrics, the UE may perform a channel access procedure 320 (e.g., an LBT procedure) prior to transmitting on a sidelink channel in unlicensed spectrum to determine whether the sidelink channel is available for transmitting the sidelink transmission 325.

The UE may be configured to perform different types of channel access procedures 320. In one aspect, a channel access procedure 320-*a* may be of a first type (which may be referred to as type 1), based on the UE initiating a distinct COT for the sidelink transmission 325, and a channel access procedure 320-*b* may be of a second type (which may be referred to as type 2), based on the UE sharing a COT with another device. Additionally or alternatively, the channel access procedure 320-*b* of the second type may have one or more sub-types based on a transmission gap within a shared COT. In one aspect, the channel access procedure 320-*b* may have a first sub-type (which may be referred to as type 2A) based on the transmission gap exceeding or having a first value (e.g., 25 microseconds (p)), a second sub-type (which may be referred to as type 2B) based on the transmission gap having a second value (e.g., 16 µs), or a third sub-type (which may be referred to as type 2C) based on the transmission gap being below the second value and a duration of the COT being below a duration threshold (e.g., 584 µs).

In some aspects, the type of the channel access procedure 320 may determine the period of time the UE performs the channel access procedure 320. In one aspect, the UE may be configured to perform an LBT procedure (e.g., sense a medium to determine availability of the sidelink channel) for 25 us for the first sub-type of the channel access procedure 320-*b*, or 16 us for the second sub-type of the channel access procedure 320-*b*. In another aspect, the UE may be configured to not perform an LBT procedure for the third sub-type of the channel access procedure 320-*b*. Accordingly, the different types of the channel access procedure 320 may correspond to different medium access probabilities for the UE, in one aspect based on the determined duration of the channel access procedure 320.

In some aspects, the UE may determine whether to transmit the sidelink transmission 325 based on the outcome of the channel access procedure 320. In one aspect, the UE may determine the UE does not have medium access on the sidelink channel in the scheduled slot based on the outcome of the channel access procedure 320, and the UE may determine to refrain from transmitting the sidelink transmission 325. Alternatively, the UE may determine the UE has medium access on the sidelink channel in the scheduled slot based on the outcome of the channel access procedure 320, and the UE may determine to transmit the sidelink transmission 325. However, because the UE performs the channel access procedure 320 shortly before the scheduled slot for the sidelink transmission 325 (e.g., to accurately sense the medium conditions for the sidelink transmission 325), the UE may perform the congestion measurement 305 based on the scheduled sidelink transmission 325, which may be subject to the result of the channel access procedure 320.

According to the techniques described herein, the UE may be configured to determine parameters for the congestion measurement 305 based on the type of the channel access procedure 320 to improve communications efficiency and a reliability of the sidelink transmission 325. In one aspect, the UE may determine a CR limit based on the type of the channel access procedure 320, where the UE may compare a determined sidelink CR to the CR limit to determine the congestion measurement 305. Additionally or alternatively, the UE may determine a sidelink RSSI threshold for a sidelink CBR measurement based on the type of the channel access procedure 320. In some aspects, the UE may determine respective CBR measurements corresponding to a set of RSSI thresholds determined based on the possible types of the channel access procedure 320, then select the CBR measurement for the congestion measurement 305 based on the determined type for the channel access procedure. In some aspects, a base station may transmit a configuration (e.g., in an SCI message or an RRC message), where the configuration may identify the type of the channel access procedure, the CR limit, the RSSI threshold, or any combination thereof. Based on the outcomes of the congestion measurement 305 and the channel access procedure 320, the UE may determine whether to transmit the sidelink transmission in the scheduled slot. Accordingly, the UE may improve communications efficiency based on the outcomes of the measurements.

Figure 4:
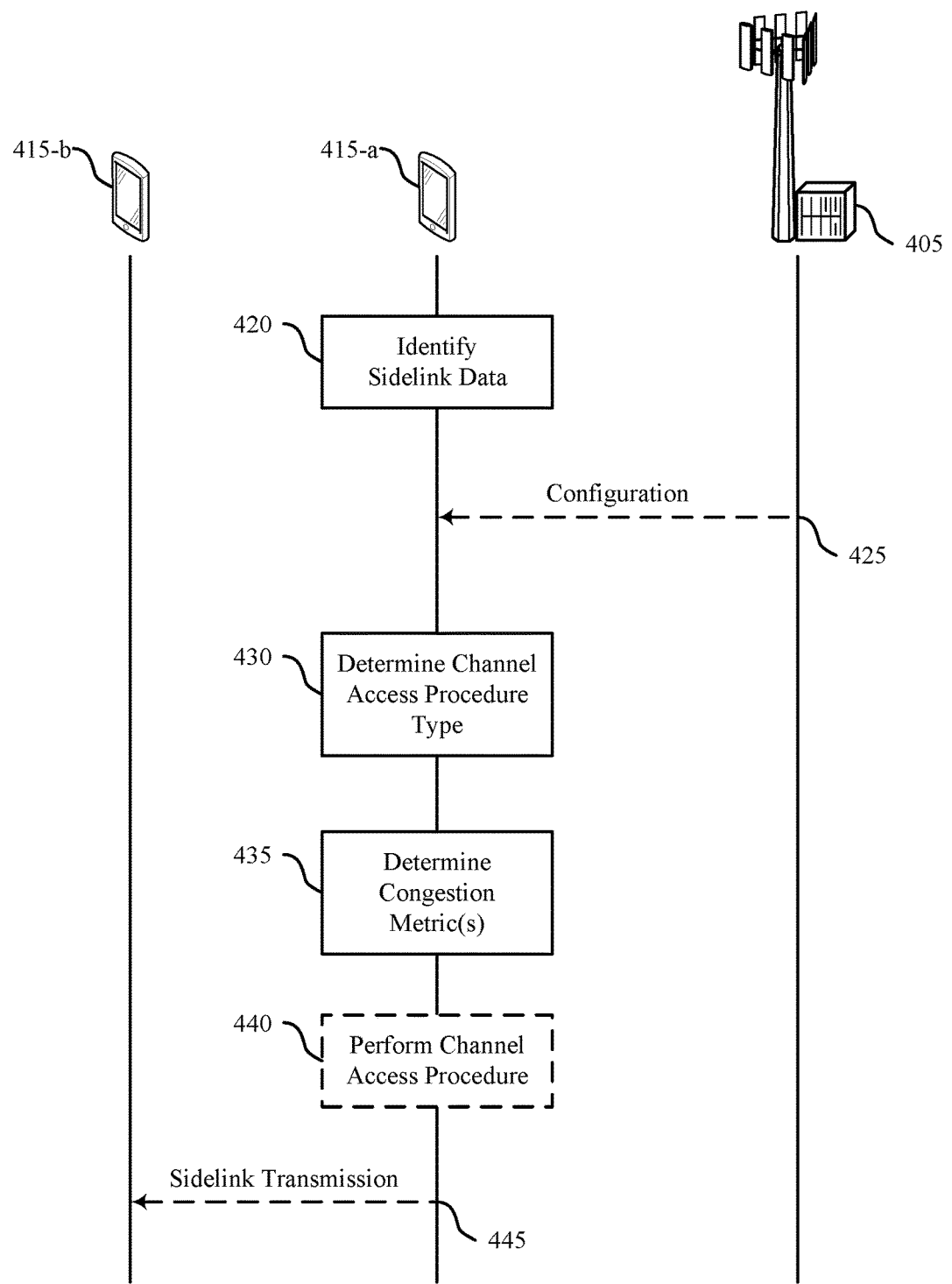
FIG. 4 illustrates an example of a process flow that supports listen before talk type dependent channel measurements for sidelink communications in accordance with aspects of the present disclosure.

FIG. 4 illustrates an example of a process flow 400 that supports LBT type dependent channel measurements for sidelink communications in accordance with aspects of the present disclosure. In some aspects, the process flow 400 may implement aspects of wireless communications systems 100 and 200. In one aspect, the process flow 400 may include example operations associated with one or more of a base station 405 or a set of UEs 415, which may be examples of the corresponding devices described with reference to FIGS. 1 and 2. In the following description of the process flow 400, the operations between the base station 405 and the UEs 415 may be performed in a different order than the example order shown, or the operations performed by the base station 405 and the UEs 415 may be performed in different orders or at different times. Some operations may also be omitted from the process flow 400, and other operations may be added to the process flow 400. The operations performed by the base station 405 and the UEs 415 may promote improvements to efficiency and reliability for sidelink communications between the UEs 415, among other benefits.

At 420, a UE 415-*a* may identify data for a sidelink transmission to a UE 415-*b* over a sidelink channel. The sidelink channel may be a shared frequency channel (e.g., in unlicensed spectrum). In some aspects, the sidelink transmission may include a PSSCH transmission, a PSCCH transmission, or both. In some aspects, at 425 the base station 405 may transmit a configuration to the UE 415-*a*. The configuration may identify a type for a channel access procedure, one or more parameters for congestion measurements, etc.

At 430, the UE 415-*a* may determine the channel access procedure type UE 415-*a* is to perform when determining whether to transmit the sidelink transmission. In some aspects, the channel access procedure may include an LBT procedure to determine whether the sidelink channel is available for transmitting the sidelink transmission. In one aspect, the UE 415-*a* may determine the type for the channel access procedure based on whether the UE 415-*a* initiates a distinct COT for the sidelink transmission or shares a COT with another UE 415 (e.g., the UE 415-*b*), or based on a transmission gap within a shared COT. The type of channel access procedure may determine the period of time the UE 415-*a* performs the channel access procedure, and so different channel access types may correspond to different medium access probabilities for the UE 415-*a*.

At 435, the UE 415-*a* may determine one or more metrics for measuring congestion on the sidelink channel before transmitting the sidelink transmission. According to some aspects, the UE 415-*a* may determine the metrics in a slot based on performing one or more channel measurements in a measurement window preceding the slot. In one aspect, the UE 415-*a* may determine a CR limit and compare a measured CR (e.g., over the measurement window) to the CR limit. The CR limit may be determined based on the channel access procedure type. In one aspect, the UE 415-*a* may maintain a lookup table including different CR limits for each channel access procedure type (e.g., and according to priority). Alternatively, the UE 415-*a* may apply different CR limit factors for each channel access procedure type. Additionally or alternatively, the UE 415-*a* may compare an RSSI for the channel to an RSSI threshold to determine a CBR, where the RSSI threshold may be determined based on the channel access procedure type. Thus, the CR limit may be based on the channel access procedure type via a limit factor or lookup table, or via a CBR threshold used to calculate a CBR, which may then be used to determine the CR limit (e.g., different ranges of CBR may be associated with different CR limits).

In some aspects, at 440 the UE 415-*a* may perform the channel access procedure based on determining the type for the channel access procedure. The channel access procedure may include an LBT procedure. In some aspects, the UE 415-*a* may determine whether to transmit the sidelink transmission based on the outcomes of the congestion measurement and the channel access procedure. In one aspect, the UE 415-*a* may determine the UE 415-*a* does not have medium access on the sidelink channel in the scheduled slot based on the outcome of the channel access procedure, or the UE 415-*a* may determine the sidelink channel is congested based on the congestion measurement, and the UE 415-*a* may determine to refrain from transmitting the sidelink transmission. Alternatively, the UE 415-*a* may determine the UE 415-*a* has medium access on the sidelink channel in the scheduled slot based on the outcome of the channel access procedure, and the UE 415-*a* may determine the sidelink channel is not congested based on the congestion measurement, and the UE 415-*a* may determine to transmit the sidelink transmission at 445. The operations performed by the base station 405 and the UEs 415 may promote improvements to sidelink transmission operations at the UE 415-*a*, among other benefits.

Figure 5:
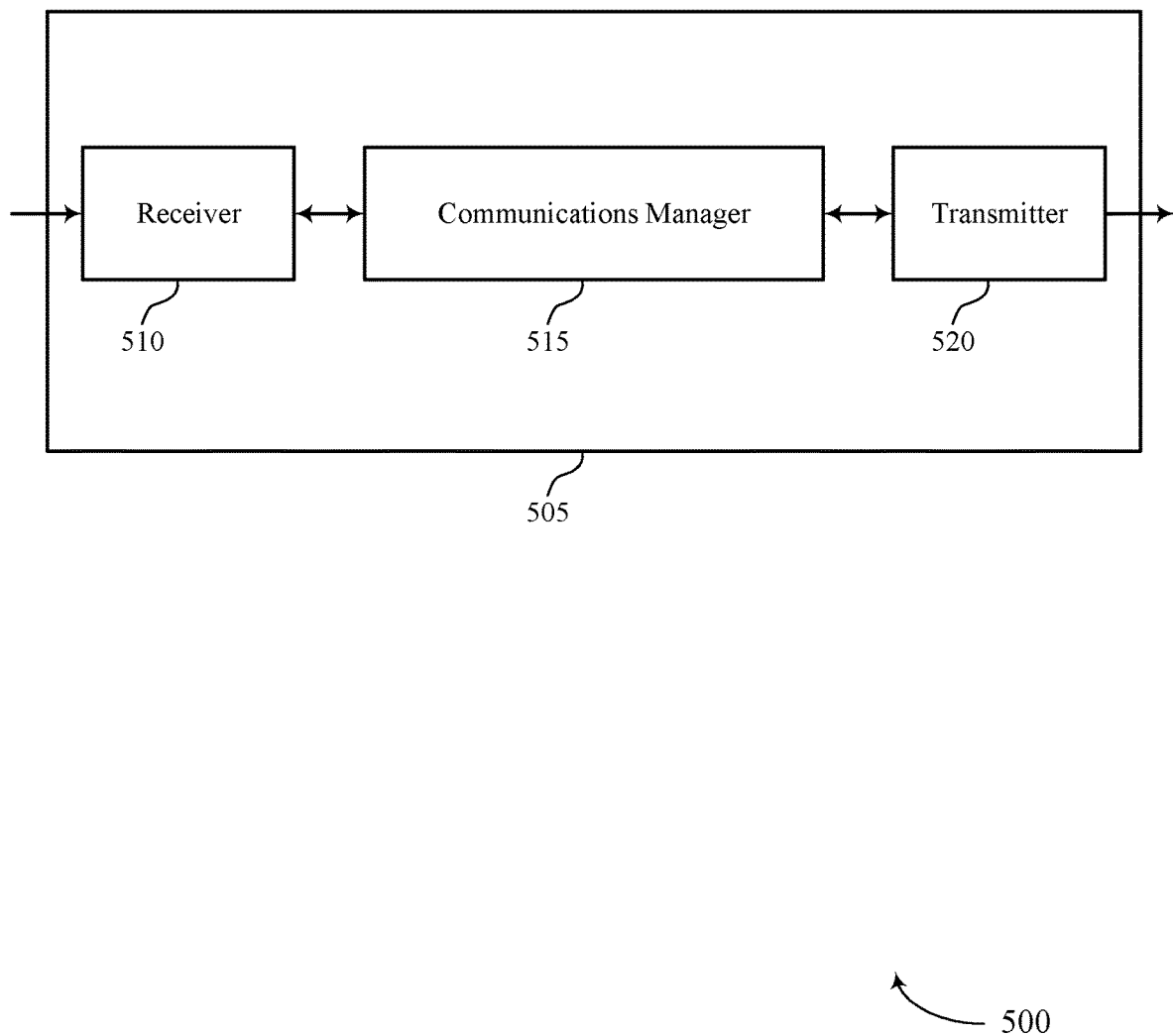
FIGS. 5 and 6 show block diagrams of devices that support listen before talk type dependent channel measurements for sidelink communications in accordance with aspects of the present disclosure.

FIG. 5 shows a block diagram 500 of a device 505 that supports listen before talk type dependent channel measurements for sidelink communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to listen before talk type dependent channel measurements for sidelink communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify data for a sidelink channel transmission over a shared frequency channel, determine a type of a channel access procedure for the sidelink channel transmission, determine a limit associated with a channel occupancy for the UE for the shared frequency channel based on the type of the channel access procedure, and determine whether to transmit the sidelink channel transmission based on a result of comparing a metric of the channel occupancy with the limit.

The communications manager 515 as described herein may be implemented to realize one or more potential advantages. One implementation may allow the device 505 to save power by communicating with UEs 115 (as shown in FIG. 1) in sidelink communications more efficiently. In one aspect, the device 505 may improve reliability in communications with UEs 115, as the device 505 may be able to determine, based on determining the channel occupancy and channel access procedure type, whether a sidelink transmission is likely to be successful. Using the techniques described herein, the device 505 may more accurately tailor channel access to channel occupancy and channel congestion limits. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some aspects, the communications manager 515, or its sub-components, may be a separate and distinct component in accordance with various aspects of the present disclosure. In some aspects, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some aspects, the transmitter 520 may be collocated with a receiver 510 in a transceiver module. In one aspect, the transmitter 520 may be an example of aspects of the transceiver 820 described with reference to FIG. 8. The transmitter 520 may utilize a single antenna or a set of antennas.

Figure 6:
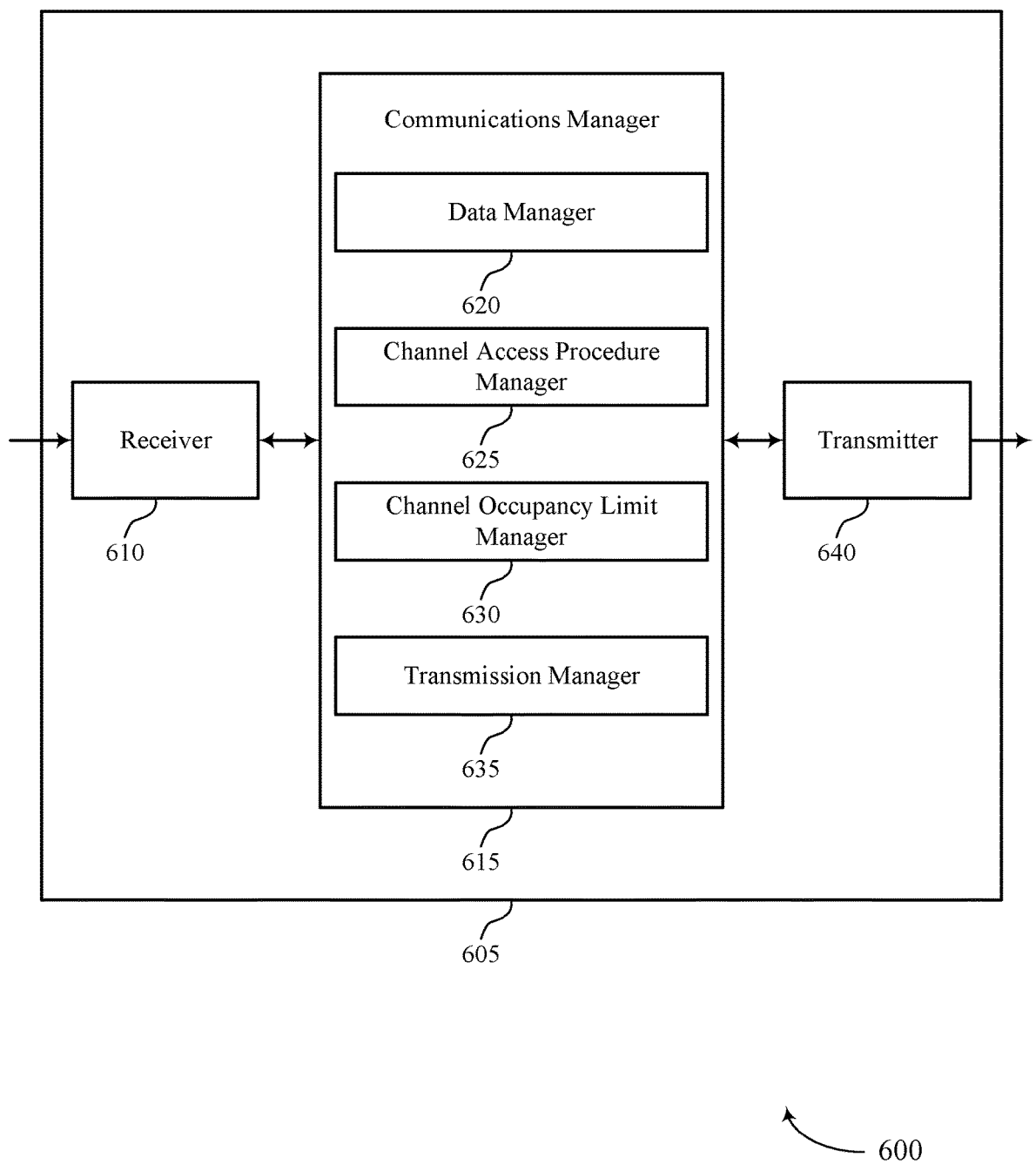

FIG. 6 shows a block diagram 600 of a device 605 that supports listen before talk type dependent channel measurements for sidelink communications in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to listen before talk type dependent channel measurements for sidelink communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a data manager 620, a channel access procedure manager 625, a channel occupancy limit manager 630, and a transmission manager 635. The communications manager 615 may be an example of aspects of the communications manager 810 described herein.

The data manager 620 may identify data for a sidelink channel transmission over a shared frequency channel.

The channel access procedure manager 625 may determine a type of a channel access procedure for the sidelink channel transmission.

The channel occupancy limit manager 630 may determine a limit associated with a channel occupancy for the UE for the shared frequency channel based on the type of the channel access procedure.

The transmission manager 635 may determine whether to transmit the sidelink channel transmission based on a result of comparing a metric of the channel occupancy with the limit.

The transmitter 640 may transmit signals generated by other components of the device 605. In some aspects, the transmitter 640 may be collocated with a receiver 610 in a transceiver module. In one aspect, the transmitter 640 may be an example of aspects of the transceiver 820 described with reference to FIG. 8. The transmitter 640 may utilize a single antenna or a set of antennas.

Figure 7:
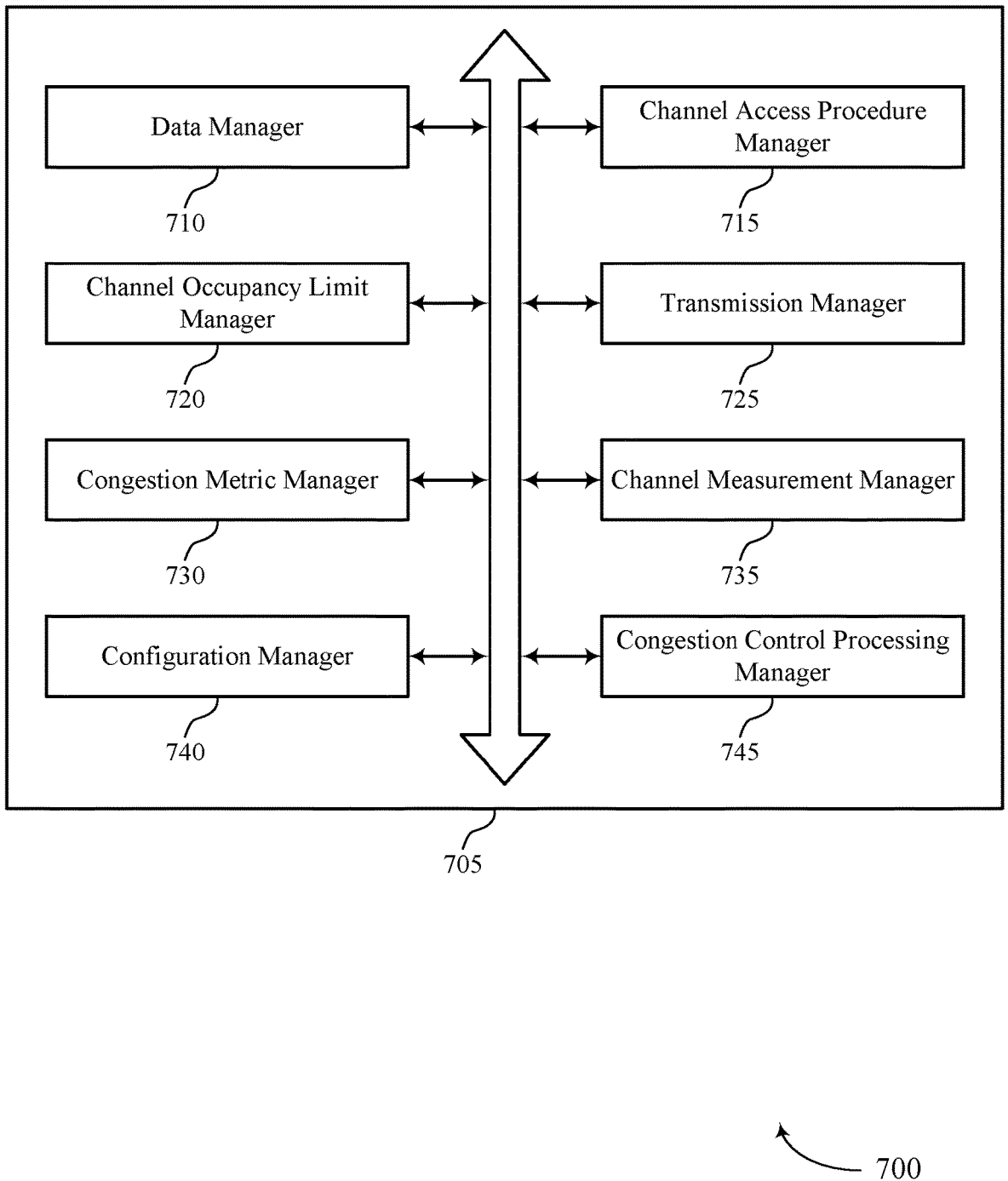
FIG. 7 shows a block diagram of a communications manager that supports listen before talk type dependent channel measurements for sidelink communications in accordance with aspects of the present disclosure.

FIG. 7 shows a block diagram 700 of a communications manager 705 that supports listen before talk type dependent channel measurements for sidelink communications in accordance with aspects of the present disclosure. The communications manager 705 may be an example of aspects of a communications manager 515, a communications manager 615, or a communications manager 810 described herein. The communications manager 705 may include a data manager 710, a channel access procedure manager 715, a channel occupancy limit manager 720, a transmission manager 725, a congestion metric manager 730, a channel measurement manager 735, a configuration manager 740, and a congestion control processing manager 745. Each of these modules may communicate, directly or indirectly, with one another (e.g., via one or more buses).

The data manager 710 may identify data for a sidelink channel transmission over a shared frequency channel.

The channel access procedure manager 715 may determine a type of a channel access procedure for the sidelink channel transmission. In some aspects, the channel access procedure manager 715 may perform the channel access procedure based on the determined type, where the determining whether to transmit the sidelink channel transmission is further based on the performing the channel access procedure.

The channel occupancy limit manager 720 may determine a limit associated with a channel occupancy for the UE for the shared frequency channel based on the type of the channel access procedure. In some aspects, the channel occupancy limit manager 720 may identify a set of limits associated with a set of types of the channel access procedure. In some aspects, the channel occupancy limit manager 720 may select the limit based on the type of the channel access procedure, where the determining the limit is further based on the selecting the limit.

In some aspects, the channel occupancy limit manager 720 may determine the channel occupancy does not exceed the limit based on the comparing. In some aspects, the channel occupancy limit manager 720 may determine the channel occupancy exceeds the limit based on the comparing. In some aspects, the channel occupancy limit manager 720 may determine a priority value associated with the sidelink channel transmission, where the determining the limit is further based on the determined priority value. In some cases, the determining the limit associated with the channel occupancy for the UE for the shared frequency channel is further based on the congestion metric.

The transmission manager 725 may determine whether to transmit the sidelink channel transmission based on a result of comparing a metric of the channel occupancy with the limit. In some aspects, the transmission manager 725 may transmit the sidelink channel transmission over the shared frequency channel based on the determining the channel occupancy does not exceed the limit. In some aspects, the transmission manager 725 may refrain from transmitting the sidelink channel transmission over the shared frequency channel based on the determining the channel occupancy exceeds the limit.

The congestion metric manager 730 may determine a threshold associated with a congestion metric for the shared frequency channel for the sidelink channel transmission based on the type of the channel access procedure. In some aspects, the congestion metric manager 730 may identify a set of thresholds associated with a set of types for the channel access procedure. In some aspects, the congestion metric manager 730 may determine a set of congestion metrics corresponding to the set of thresholds. In some aspects, the congestion metric manager 730 may select the congestion metric from the set of congestion metrics based on the type of the channel access procedure. In some cases, the threshold includes a received signal strength indicator threshold.

The channel measurement manager 735 may perform one or more channel measurements of the shared frequency channel based on the determined threshold to obtain the congestion metric, where the determining whether to transmit the sidelink channel transmission is based on the congestion metric. In some aspects, comparing, for each of the one or more channel measurements, the one or more channel measurements to the determined threshold to obtain a channel busy ratio for the shared frequency channel, where the congestion metric includes the channel busy ratio.

The configuration manager 740 may determine a configuration indicating the type of the channel access procedure and the limit associated with the channel occupancy, where the determining the type and the determining the limit is based on the receiving the configuration. In some cases, the configuration manager 740 may receive an indication of the configuration in a sidelink control information message, a radio resource control message, or a combination thereof, where the determining the configuration is based on the receiving the indication.

The congestion control processing manager 745 may determine a congestion control processing time based on a UE processing capability, where the comparing the channel occupancy with the limit is further based on the determining the congestion control processing time.

Figure 8:
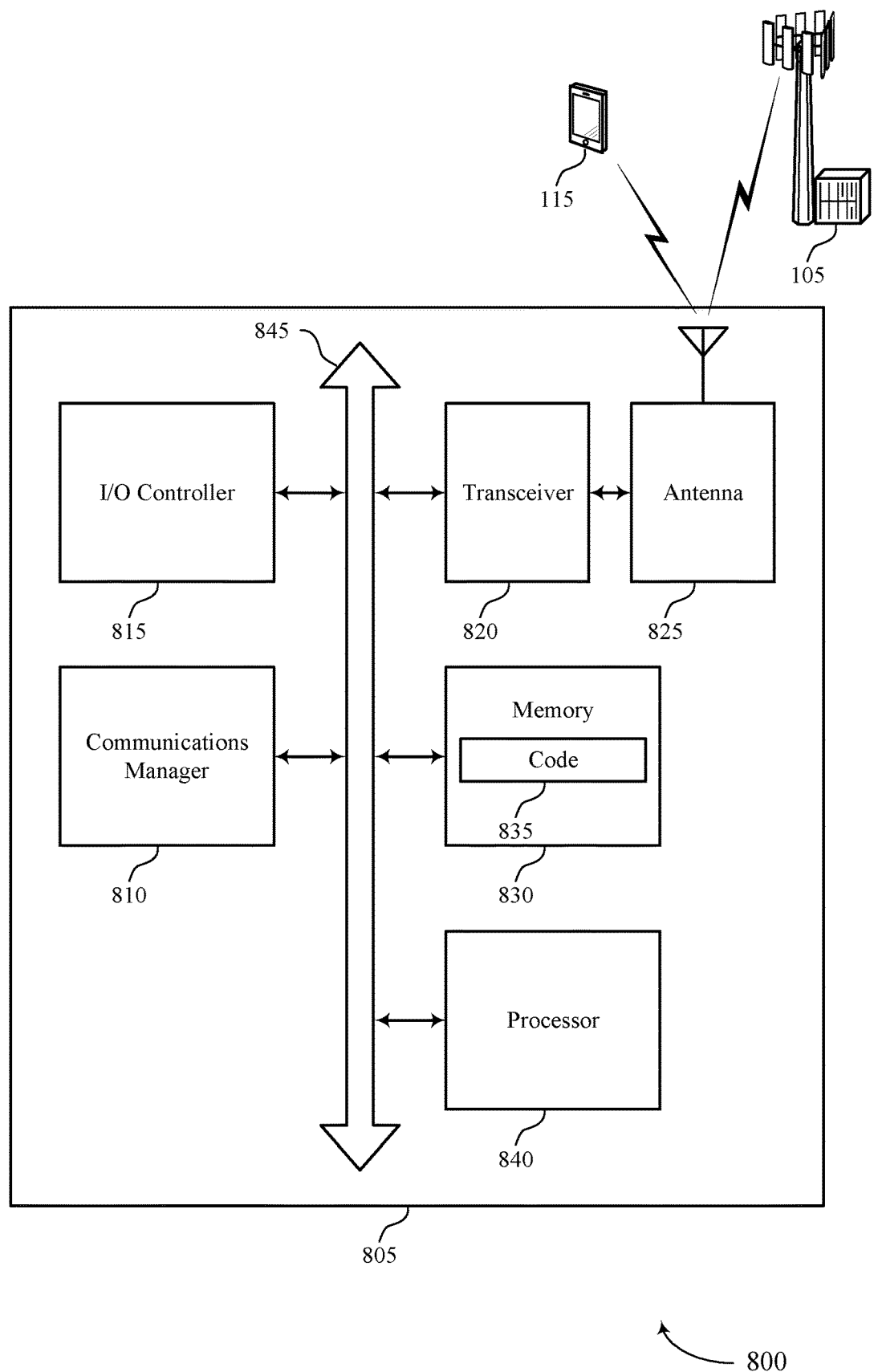
FIG. 8 shows a diagram of a system including a device that supports listen before talk type dependent channel measurements for sidelink communications in accordance with aspects of the present disclosure.

FIG. 8 shows a diagram of a system 800 including a device 805 that supports listen before talk type dependent channel measurements for sidelink communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify data for a sidelink channel transmission over a shared frequency channel, determine a type of a channel access procedure for the sidelink channel transmission, determine a limit associated with a channel occupancy for the UE for the shared frequency channel based on the type of the channel access procedure, and determine whether to transmit the sidelink channel transmission based on a result of comparing a metric of the channel occupancy with the limit.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. In one aspect, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting listen before talk type dependent channel measurements for sidelink communications).

The processor 840 of the device 805 (e.g., controlling the receiver 510, the transmitter 520, or the transceiver 820) may reduce power consumption and increase sidelink transmission reliability according to the techniques described herein. In some aspects, the processor 840 of the device 805 may measure channel congestion based on determining the channel access procedure type. For example, the processor 840 of the device 805 may turn on one or more processing units for measuring channel congestions, increase a processing clock, or a similar mechanism within the device 805. As such, when subsequent sidelink transmissions are scheduled, the processor 840 may more accurately tailor channel access to channel occupancy and channel congestion limits. Improvements in channel access may result in improvements in power saving and sidelink transmission reliability, which may further increase power efficiency at the device 805 (e.g., by eliminating unnecessary repeated sidelink LBT procedures or transmissions, etc.).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
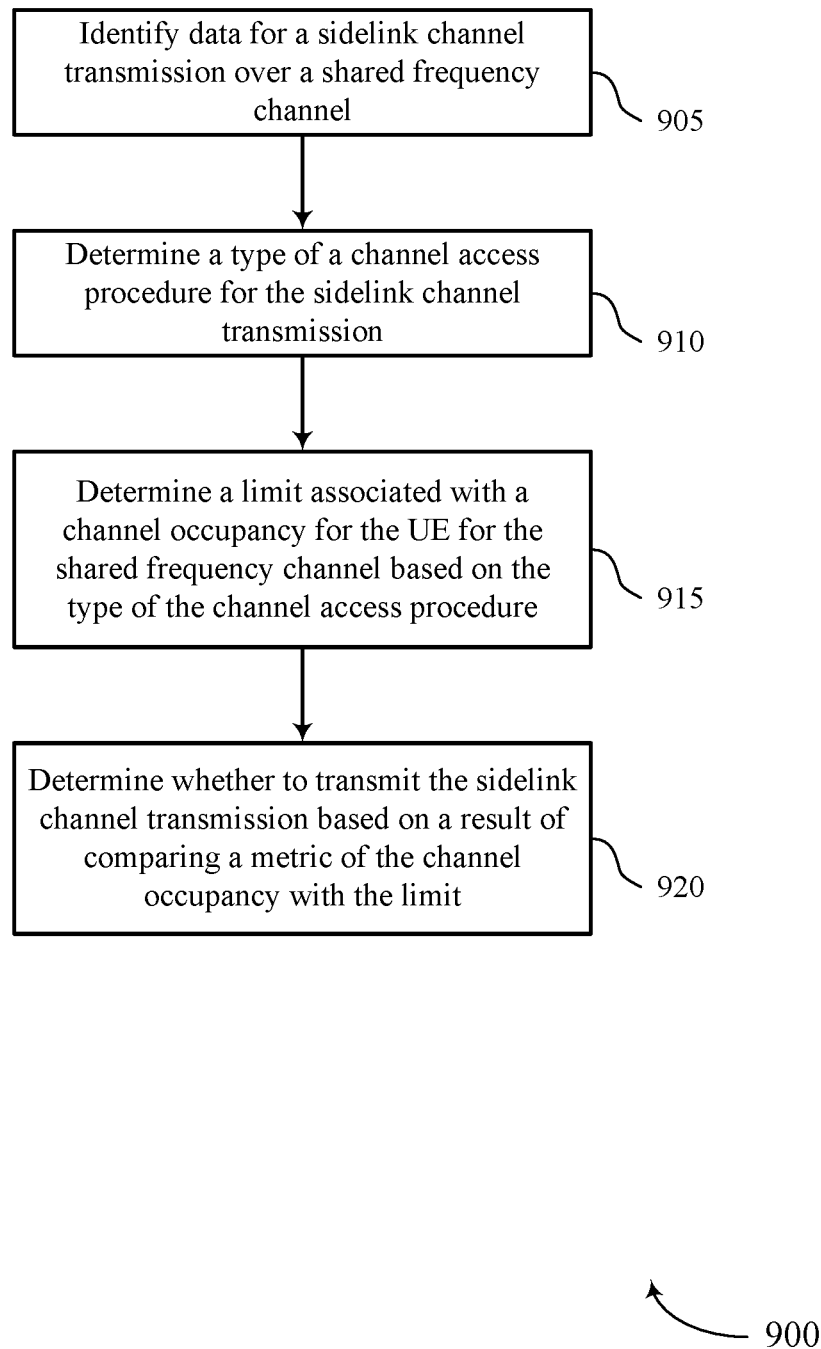
FIGS. 9 through 11 show flowcharts illustrating methods that support listen before talk type dependent channel measurements for sidelink communications in accordance with aspects of the present disclosure.

FIG. 9 shows a flowchart illustrating a method 900 that supports listen before talk type dependent channel measurements for sidelink communications in accordance with aspects of the present disclosure. The operations of method 900 may be implemented by a UE 115 or its components as described herein. In one aspect, the operations of method 900 may be performed by a communications manager as described with reference to FIGS. 5 through 8. In some aspects, a UE may execute a set of instructions to control the functional elements of the UE to perform the functions described below. Additionally or alternatively, a UE may perform aspects of the functions described below using special-purpose hardware.

At 905, the UE may identify data for a sidelink channel transmission over a shared frequency channel. The operations of 905 may be performed according to the methods described herein. In some aspects, aspects of the operations of 905 may be performed by a data manager as described with reference to FIGS. 5 through 8.

At 910, the UE may determine a type of a channel access procedure for the sidelink channel transmission. The operations of 910 may be performed according to the methods described herein. In some aspects, aspects of the operations of 910 may be performed by a channel access procedure manager as described with reference to FIGS. 5 through 8.

At 915, the UE may determine a limit associated with a channel occupancy for the UE for the shared frequency channel based on the type of the channel access procedure. The operations of 915 may be performed according to the methods described herein. In some aspects, aspects of the operations of 915 may be performed by a channel occupancy limit manager as described with reference to FIGS. 5 through 8.

At 920, the UE may determine whether to transmit the sidelink channel transmission based on a result of comparing a metric of the channel occupancy with the limit. The operations of 920 may be performed according to the methods described herein. In some aspects, aspects of the operations of 920 may be performed by a transmission manager as described with reference to FIGS. 5 through 8.

Figure 10:
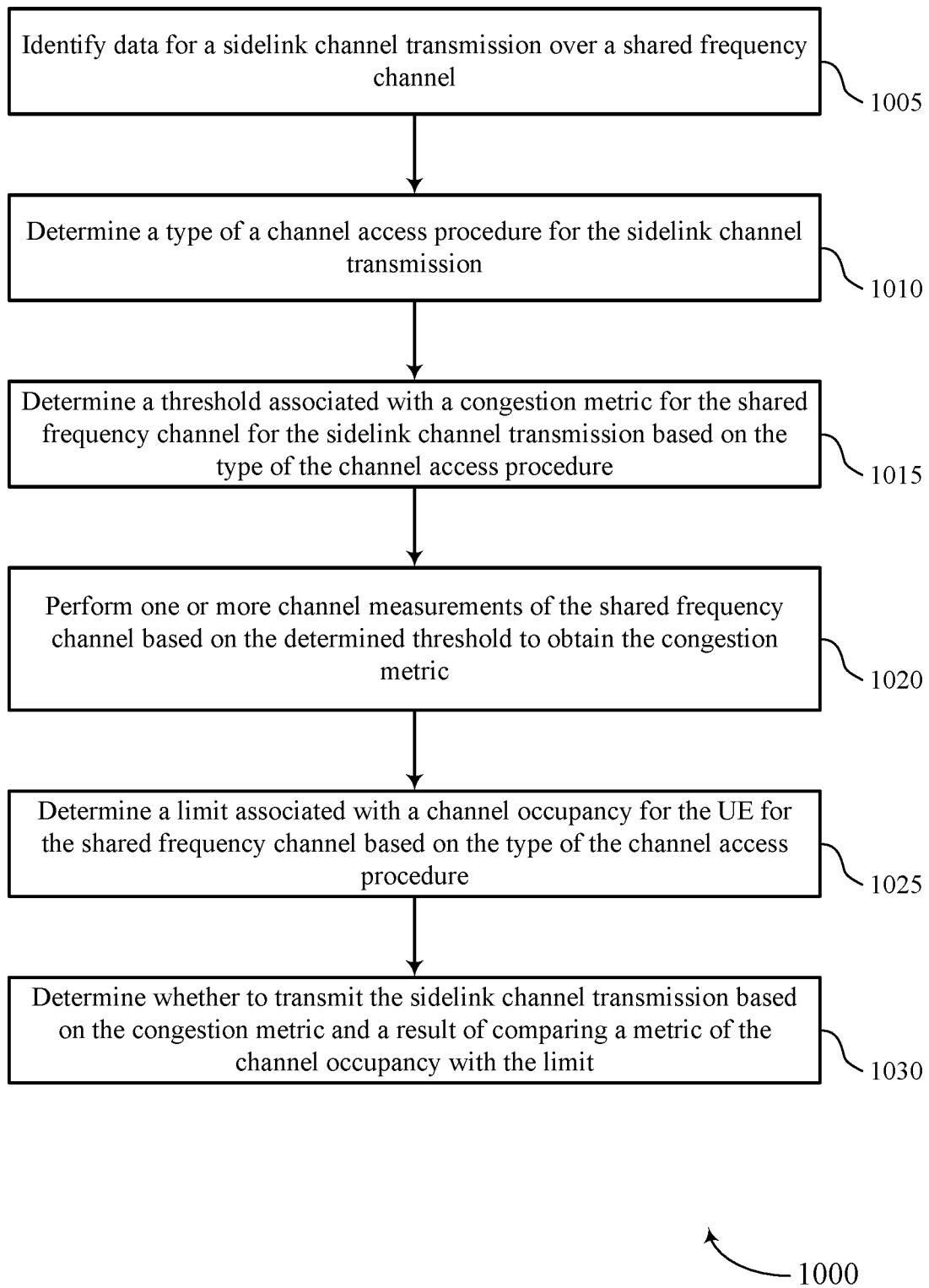

FIG. 10 shows a flowchart illustrating a method 1000 that supports listen before talk type dependent channel measurements for sidelink communications in accordance with aspects of the present disclosure. The operations of method 1000 may be implemented by a UE 115 or its components as described herein. In one aspect, the operations of method 1000 may be performed by a communications manager as described with reference to FIGS. 5 through 8. In some aspects, a UE may execute a set of instructions to control the functional elements of the UE to perform the functions described below. Additionally or alternatively, a UE may perform aspects of the functions described below using special-purpose hardware.

At 1005, the UE may identify data for a sidelink channel transmission over a shared frequency channel. The operations of 1005 may be performed according to the methods described herein. In some aspects, aspects of the operations of 1005 may be performed by a data manager as described with reference to FIGS. 5 through 8.

At 1010, the UE may determine a type of a channel access procedure for the sidelink channel transmission. The operations of 1010 may be performed according to the methods described herein. In some aspects, aspects of the operations of 1010 may be performed by a channel access procedure manager as described with reference to FIGS. 5 through 8.

At 1015, the UE may determine a threshold associated with a congestion metric for the shared frequency channel for the sidelink channel transmission based on the type of the channel access procedure. The operations of 1015 may be performed according to the methods described herein. In some aspects, aspects of the operations of 1015 may be performed by a congestion metric manager as described with reference to FIGS. 5 through 8.

At 1020, the UE may perform one or more channel measurements of the shared frequency channel based on the determined threshold to obtain the congestion metric. The operations of 1020 may be performed according to the methods described herein. In some aspects, aspects of the operations of 1020 may be performed by a channel measurement manager as described with reference to FIGS. 5 through 8.

At 1025, the UE may determine a limit associated with a channel occupancy for the UE for the shared frequency channel based on the type of the channel access procedure. The operations of 1025 may be performed according to the methods described herein. In some aspects, aspects of the operations of 1025 may be performed by a channel occupancy limit manager as described with reference to FIGS. 5 through 8.

At 1030, the UE may determine whether to transmit the sidelink channel transmission based on the congestion metric and a result of comparing a metric of the channel occupancy with the limit. The operations of 1030 may be performed according to the methods described herein. In some aspects, aspects of the operations of 1030 may be performed by a transmission manager as described with reference to FIGS. 5 through 8.

Figure 11:
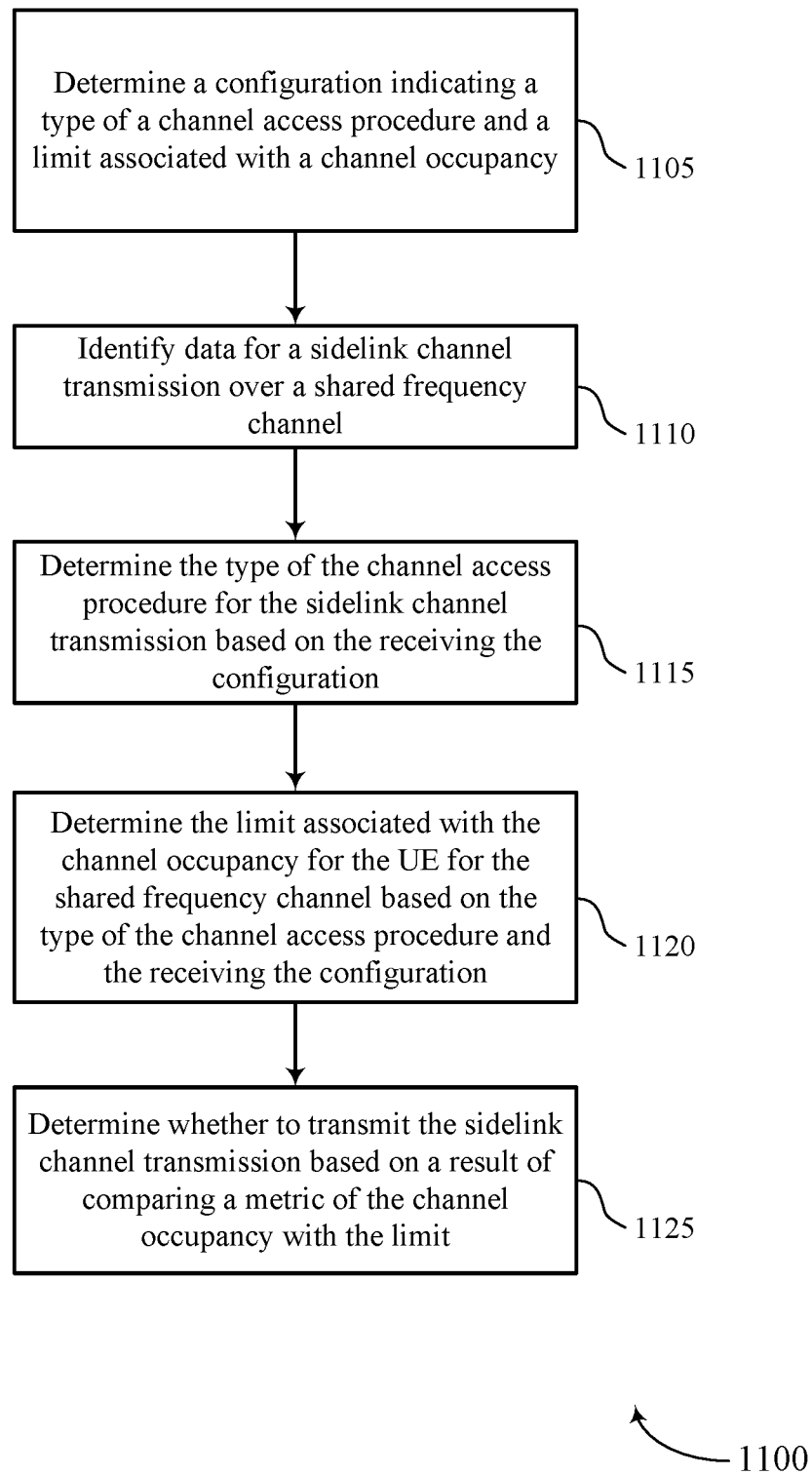

FIG. 11 shows a flowchart illustrating a method 1100 that supports listen before talk type dependent channel measurements for sidelink communications in accordance with aspects of the present disclosure. The operations of method 1100 may be implemented by a UE 115 or its components as described herein. In one aspect, the operations of method 1100 may be performed by a communications manager as described with reference to FIGS. 5 through 8. In some aspects, a UE may execute a set of instructions to control the functional elements of the UE to perform the functions described below. Additionally or alternatively, a UE may perform aspects of the functions described below using special-purpose hardware.

At 1105, the UE may determine a configuration indicating a type of a channel access procedure and a limit associated with a channel occupancy. The operations of 1105 may be performed according to the methods described herein. In some aspects, aspects of the operations of 1105 may be performed by a configuration manager as described with reference to FIGS. 5 through 8.

At 1110, the UE may identify data for a sidelink channel transmission over a shared frequency channel. The operations of 1110 may be performed according to the methods described herein. In some aspects, aspects of the operations of 1110 may be performed by a data manager as described with reference to FIGS. 5 through 8.

At 1115, the UE may determine the type of the channel access procedure for the sidelink channel transmission based on the receiving the configuration. The operations of 1115 may be performed according to the methods described herein. In some aspects, aspects of the operations of 1115 may be performed by a channel access procedure manager as described with reference to FIGS. 5 through 8.

At 1120, the UE may determine the limit associated with the channel occupancy for the UE for the shared frequency channel based on the type of the channel access procedure and the receiving the configuration. The operations of 1120 may be performed according to the methods described herein. In some aspects, aspects of the operations of 1120 may be performed by a channel occupancy limit manager as described with reference to FIGS. 5 through 8.

At 1125, the UE may determine whether to transmit the sidelink channel transmission based on a result of comparing a metric of the channel occupancy with the limit. The operations of 1125 may be performed according to the methods described herein. In some aspects, aspects of the operations of 1125 may be performed by a transmission manager as described with reference to FIGS. 5 through 8.

The following provides an overview of aspects of the present disclosure:

Aspect 1: A method for wireless communications implemented by a UE, comprising: performing one or more channel measurements of a shared frequency channel; performing a channel access procedure for a sidelink transmission over the shared frequency channel based at least in part on a type of the channel access procedure; comparing a metric of a channel occupancy for the shared frequency channel with a limit associated with the channel occupancy based at least in part on the type of the channel access procedure; and transmitting the sidelink channel transmission based at least in part on a result of comparing the metric of the channel occupancy with the limit.

Aspect 2: The method of aspect 1, wherein performing the one or more channel measurements comprises: performing the one or more channel measurements of the shared frequency channel to obtain a congestion metric based at least in part on a threshold associated with the type of the channel access procedure, wherein the transmitting the sidelink channel transmission is based at least in part on the congestion metric.

Aspect 3: The method of aspect 2, further comprising: selecting the congestion metric from a plurality of congestion metrics based at least in part on the type of the channel access procedure, the plurality of congestion metrics corresponding to a plurality of thresholds associated with a plurality of types for the channel access procedure.

Aspect 4: The method of any of aspects 2 through 3, wherein the limit associated with the channel occupancy for the UE for the shared frequency channel is further based at least in part on the congestion metric.

Aspect 5: The method of any of aspects 2 through 4, further comprising: comparing, for each of the one or more channel measurements, the one or more channel measurements to the determined threshold to obtain a channel busy ratio for the shared frequency channel, wherein the congestion metric comprises the channel busy ratio.

Aspect 6: The method of any of aspects 2 through 5, wherein the threshold comprises a received signal strength indicator threshold.

Aspect 7: The method of any of aspects 1 through 6, further comprising: selecting the limit from a plurality of limits based at least in part on the type of the channel access procedure, the plurality of limits associated with a plurality of types of the channel access procedure.

Aspect 8: The method of any of aspects 1 through 7, further comprising: receiving a configuration indicating the type of the channel access procedure and the limit associated with the channel occupancy, wherein the type of the channel access procedure and the limit are based at least in part on the receiving the configuration.

Aspect 9: The method of aspect 8, wherein an indication of the configuration is received in a sidelink control information message, a radio resource control message, or a combination thereof.

Aspect 10: The method of any of aspects 1 through 9, wherein the transmitting the sidelink channel transmission over the shared frequency channel is based at least in part on the channel occupancy not exceeding the limit.

Aspect 11: The method of any of aspects 1 through 10, wherein the comparing the channel occupancy with the limit is further based at least in part on a congestion control processing time associated with a UE processing capability.

Aspect 12: The method of any of aspects 1 through 11, wherein the limit is based at least in part on a priority value associated with the sidelink channel transmission.

Aspect 13: An apparatus for wireless communications implemented by a UE, comprising a processor; memory coupled with the processor; and instructions stored in the memory and executable by the processor to cause the apparatus to perform a method of any of aspects 1 through 12.

Aspect 14: An apparatus for wireless communications implemented by a UE, comprising at least one means for performing a method of any of aspects 1 through 12.

Aspect 15: A non-transitory computer-readable medium storing code for wireless communications implemented by a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. In one aspect, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. In one aspect, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. In one aspect, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. In one aspect, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, in one aspect, a list of at least one of A, B, or C means A or B or C or AB or AC or BC or ABC (i.e., A and B and C). Also, as used herein, the phrase "based on" shall not be construed as a reference to a closed set of conditions. In one aspect, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications implemented by a user equipment (UE), comprising:
a processor; and
memory coupled with the processor, wherein the memory comprises instructions
executable by the processor to cause the apparatus to:
perform one or more channel measurements of a shared frequency channel;
obtain a channel busy ratio based at least in part on comparing the one or more channel measurements with a threshold, the threshold based at least in part on a type of a listen-before-talk procedure associated with obtaining access to the shared frequency channel for a slot for transmitting a sidelink channel transmission;
perform the listen-before-talk procedure to obtain access to the shared frequency channel for the slot, wherein determining to perform the listen-before-talk procedure is based at least in part on a value of the channel busy ratio;
and
transmit the sidelink channel transmission in the slot based at least in part on a result of the listen-before-talk procedure.

2. The apparatus of claim 1, wherein the channel busy ratio is a congestion metric, and wherein the instructions are further executable by the processor to cause the apparatus to:
select the congestion metric from a plurality of congestion metrics based at least in part on the type of the listen-before-talk procedure, the plurality of congestion metrics corresponding to a plurality of thresholds associated with a plurality of types for the listen-before-talk procedure.

3. The apparatus of claim 1, wherein a limit associated with channel occupancy for the UE for the shared frequency channel is based at least in part on the channel busy ratio.

4. The apparatus of claim 1, wherein the instructions are further executable by the processor to cause the apparatus to:
compare, for each of the one or more channel measurements, the one or more channel measurements to the threshold to obtain the channel busy ratio for the shared frequency channel.

5. The apparatus of claim 1, wherein the threshold comprises a received signal strength indicator threshold.

6. The apparatus of claim 1, wherein the instructions are further executable by the processor to cause the apparatus to:
select a limit associated with channel occupancy from a plurality of limits based at least in part on the type of the listen-before-talk procedure, the plurality of limits associated with a plurality of types of the listen-before-talk procedure.

7. The apparatus of claim 1, wherein the instructions are further executable by the processor to cause the apparatus to:
receive a configuration indicating the type of the listen-before-talk procedure and a limit associated with channel occupancy, wherein the type of the listen-before-talk procedure and the limit are based at least in part on the receiving the configuration.

8. The apparatus of claim 7, wherein an indication of the configuration is received in a sidelink control information message, a radio resource control message, or a combination thereof.

9. The apparatus of claim 1, wherein the transmitting the sidelink channel transmission over the shared frequency channel is based at least in part on a channel occupancy not exceeding a limit associated with the channel occupancy.

10. The apparatus of claim 1, wherein the instructions are further executable by the processor to cause the apparatus to:
comparing a channel occupancy with a limit associated with the channel occupancy based at least in part on a congestion control processing time associated with a UE processing capability.

11. The apparatus of claim 1, wherein a limit associated with channel occupancy is based at least in part on a priority value associated with the sidelink channel transmission.

12. A method for wireless communications implemented by a user equipment (UE), comprising:
performing one or more channel measurements of a shared frequency channel;
obtain a channel busy ratio based at least in part on comparing the one or more channel measurements with a threshold, the threshold based at least in part on a type of a listen-before-talk procedure associated with obtaining access to the shared frequency channel for a slot for transmitting a sidelink channel transmission;
performing the listen-before-talk procedure to obtain access to the shared frequency channel for the slot, wherein determining to perform the listen-before-talk procedure is based at least in part on a value of the channel busy ratio;
and
transmitting the sidelink channel transmission in the slot based at least in part on a result of the listen-before-talk procedure.

13. The method of claim 12, wherein the channel busy ratio is a congestion metric, the method further comprising:
selecting the congestion metric from a plurality of congestion metrics based at least in part on the type of the listen-before-talk procedure, the plurality of congestion metrics corresponding to a plurality of thresholds associated with a plurality of types for the listen-before-talk procedure.

14. The method of claim 12, wherein a limit associated with channel occupancy for the UE for the shared frequency channel is based at least in part on the channel busy ratio.

15. The method of claim 12, further comprising:
compare, for each of the one or more channel measurements, the one or more channel measurements to the threshold to obtain the channel busy ratio for the shared frequency channel.

16. The method of claim 12, wherein the threshold comprises a received signal strength indicator threshold.

17. The method of claim 12, further comprising:
selecting a limit associated with channel occupancy from a plurality of limits based at least in part on the type of the listen-before-talk procedure, the plurality of limits associated with a plurality of types of the listen-before-talk procedure.

18. The method of claim 12, further comprising:
receiving a configuration indicating the type of the listen-before-talk procedure and a limit associated with channel occupancy, wherein the type of the listen-beforetalk procedure and the limit are based at least in part on the receiving the configuration.

19. The method of claim 18, wherein an indication of the configuration is received in a sidelink control information message, a radio resource control message, or a combination thereof.

20. The method of claim 12, wherein the transmitting the sidelink channel transmission over the shared frequency channel is based at least in part on a channel occupancy not exceeding a limit associated with the channel occupancy.

21. The method of claim 12, further comprising:
comparing a channel occupancy with a limit associated with the channel occupancy based at least in part on a congestion control processing time associated with a UE processing capability.

22. The method of claim 12, wherein a limit associated with channel occupancy is based at least in part on a priority value associated with the sidelink channel transmission.

23. An apparatus for wireless communications implemented by a user equipment (UE), comprising:
means for performing one or more channel measurements of a shared frequency channel;
means for obtaining a channel busy ratio based at least in part on comparing the one or more channel measurements with a threshold, the threshold based at least in part on a type of a listen-before-talk procedure associated with obtaining access to the shared frequency channel for a slot for transmitting a sidelink channel transmission;
means for performing the listen-before-talk procedure to obtain access to the shared frequency channel for the slot, wherein determining to perform the listen-before-talk procedure is based at least in part on a value of the channel busy ratio;
and
means for transmitting the sidelink channel transmission in the slot based at least in part on a result of the listen-before-talk procedure.

24. The apparatus of claim 23, wherein the transmitting the sidelink channel transmission over the shared frequency channel is based at least in part on a channel occupancy not exceeding a limit associated with the channel occupancy.

25. A non-transitory computer-readable medium storing code for wireless communications implemented by a user equipment (UE), the code comprising instructions executable by a processor to:
perform, within a measurement window, one or more channel measurements of a shared frequency channel;
obtain a channel busy ratio based at least in part on comparing the one or more channel measurements with a threshold, the threshold based at least in part on a type of a listen-before-talk procedure associated with obtaining access to the shared frequency channel for a slot for transmitting a sidelink channel transmission;
perform the listen-before-talk procedure to obtain access to the shared frequency channel for the slot, wherein determining to perform the listen-before-talk procedure is based at least in part on a value of the channel busy ratio;
and
transmit the sidelink channel transmission in the slot based at least in part on a result of the listen-before-talk procedure.

26. The non-transitory computer-readable medium of claim 25, wherein the transmitting the sidelink channel transmission over the shared frequency channel is based at least in part on a channel occupancy not exceeding a limit associated with the channel occupancy.

* * * * *